(12) United States Patent
Grosseruschkamp et al.

(10) Patent No.: US 11,351,754 B2
(45) Date of Patent: Jun. 7, 2022

(54) STEEL MATERIAL COMPOSITE, METHOD FOR PRODUCING A COMPONENT, AND USE

(71) Applicants: ThyssenKrupp Steel Europe AG, Duisburg (DE); thyssenkrupp AG, Essen (DE)

(72) Inventors: Thomas Grosseruschkamp, Duisburg (DE); Maik Bogatsch, Duisburg (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 16/769,033

(22) PCT Filed: Dec. 5, 2017

(86) PCT No.: PCT/EP2017/081484
§ 371 (c)(1),
(2) Date: Jun. 2, 2020

(87) PCT Pub. No.: WO2019/110087
PCT Pub. Date: Jun. 13, 2019

(65) Prior Publication Data
US 2021/0213708 A1    Jul. 15, 2021

(51) Int. Cl.
*B32B 15/01* (2006.01)
*B23K 20/02* (2006.01)
(Continued)

(52) U.S. Cl.
CPC .......... *B32B 15/011* (2013.01); *B23K 20/023* (2013.01); *C21D 6/004* (2013.01); *C21D 6/005* (2013.01); *C21D 6/007* (2013.01); *C21D 6/008* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01);
(Continued)

(58) Field of Classification Search
None
See application file for complete search history.

(56) References Cited

U.S. PATENT DOCUMENTS 9,902,133 B2 *   2/2018   Becker ................. C21D 1/673
2012/0202090 A1   8/2012   Yamamoto et al.
(Continued)

FOREIGN PATENT DOCUMENTS

CN    2418330      2/2001
CN    102596488 A  7/2012
(Continued)

OTHER PUBLICATIONS

DIN EN 10085—Nitriding steels—Technical delivery conditions, Jul. 2001.
(Continued)

*Primary Examiner* — Daniel J. Schleis
(74) *Attorney, Agent, or Firm* — RMCK Law Group PLC

(57) ABSTRACT

The present invention relates to a steel material composite having at least two layers (1, 2, 3, 4), comprising at least one first layer (1, 3) of a material-removable and/or shearable steel and at least one second layer (2, 4) of a formable steel, cohesively bonded to the first layer (1, 3).

5 Claims, 3 Drawing Sheets

(51) Int. Cl.
*C21D 6/00* (2006.01)
*C22C 38/00* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/52* (2006.01)
*C22C 38/54* (2006.01)
*B23K 103/04* (2006.01)
*B23K 101/00* (2006.01)

(52) U.S. Cl.
CPC .............. *C22C 38/50* (2013.01); *C22C 38/52* (2013.01); *C22C 38/54* (2013.01); *B23K 2101/006* (2018.08); *B23K 2103/04* (2018.08); *Y10T 428/12972* (2015.01)

(56) References Cited

U.S. PATENT DOCUMENTS

| | | | |
|---|---|---|---|
| 2014/0178633 A1 | 6/2014 | Kleinschmidt et al. | |
| 2016/0311197 A1* | 10/2016 | Becker | C22C 38/38 |
| 2017/0014942 A1 | 1/2017 | Nanbu et al. | |
| 2017/0297304 A1* | 10/2017 | Becker | B23K 20/227 |
| 2018/0243863 A1* | 8/2018 | Myslowicki | B32B 15/011 |
| 2019/0084076 A1 | 3/2019 | Ferkel et al. | |

FOREIGN PATENT DOCUMENTS

| | | | |
|---|---|---|---|
| CN | 103619578 A | 3/2014 | |
| CN | 106102978 A | 11/2016 | |
| DE | 102005006606 | 3/2006 | |
| DE | 102016204567 A1 | 9/2017 | |
| JP | S51119612 A | 10/1976 | |
| JP | H0356644 A | 3/1991 | |
| JP | H03133630 A | 6/1991 | |
| JP | H03222738 A | 10/1991 | |
| JP | 2017512247 A | 5/2017 | |
| WO | 2016050417 A1 | 4/2016 | |
| WO | WO-2016050417 A1 * | 4/2016 | ............ C21D 1/673 |
| WO | 2017042005 A1 | 3/2017 | |
| WO | 2017157681 A1 | 9/2017 | |

OTHER PUBLICATIONS

DIN EN 10111—Continuously hot rolled low carbon steel sheet and strip for cold forming—Technical delivery conditions, Jun. 2008.
DIN EN 10130—Cold rolled low carbon steel flat products for cold forming, Technical delivery conditions, Feb. 2007.
DIN EN 10149-2, Hot rolled flat products made of high yield strength steels for cold forming—Part 2: Technical delivery conditions for thermomechanically rolled steels; Dec. 2013.
DIN EN 10346—Continuously hot-dip coated steel flat products for cold forming—Technical delivery conditions, Oct. 2015.
DIN EN ISO 10087—Small craft—Craft Identification—Coding System (ISO 10087:2019).
ISO 10084—Solid fertilizers—Determination of mineral-acid-soluble sulfate content—Gravimetric method, Dec. 1, 1992.
International Search Report and Written Opinion for International Application No. PCT/EP2017/081484 dated Feb. 20, 2018 with English translation.
Chinese Search Report for CN Application No. 2017800875234 dated May 12, 2021.
2nd Chinese Office Action for CN Application No. 201780097523.4 dated Dec. 7, 2021.
Mechanical Engineering Material—Free Cutting Steel with English translation.
Japanese Office Action for JP Application No. 2020-530459 dated Jan. 5, 2022.

* cited by examiner

STEEL MATERIAL COMPOSITE, METHOD FOR PRODUCING A COMPONENT, AND USE

CROSS-REFERENCE TO RELATED APPLICATIONS

This application is a 371 U.S. National Stage of International Application No. PCT/EP2017/081484, filed Dec. 5, 2017. The disclosure of the above application is incorporated herein by reference in its entirety.

TECHNICAL FIELD

The invention relates to a steel material composite having at least two layers of steel. The invention further relates to a method for producing a component and to a use of the component.

BACKGROUND ART

In motor vehicle construction, for example in the region of the drivetrain of a motor vehicle, components that have to be processed in a material-removing manner owing to accuracy and/or surface demands are used.

The prior art discloses material-removable and/or shearable steels. For the most part, these are provided from semifinished products that are usually provided in cylindrical form and are especially used for production of rotationally symmetric components, predominantly by subjecting them in the form of a solid material to a material-removing rotary processing operation until the final geometry has been created. This mode of processing is very material-intensive and costly.

In order to reduce at least material input, it is possible to usually form material-removable and/or shearable steels from a two-dimensional product to give a preliminary geometry before they are processed mechanically or by material removal to create the final geometry. Steels having good material removability and/or shearability generally have poor forming properties since the alloy constituents, for example lead, phosphorus and/or sulfur, that enable good material removability are detrimental to formability. Steels are used that have good formability but do not show the desired material removal characteristics, but rather form what are called continuous chips. A disadvantage in the case of formation of continuous chips is that they can damage the surface of the workpiece to be processed. Furthermore, the material-removing tool can become blocked as a result, which increases cleaning complexity and hence in turn can extend the processing time. The service life of the material-removing tool can also be shortened.

SUMMARY OF INVENTION

It is thus the object of the invention to provide a semifinished product that combines the abovementioned opposing properties, as a result of which the aforementioned disadvantages can be essentially compensated for or reduced.

This object is achieved by a steel material composite having the features of claim 1.

In order to combine the abovementioned opposing properties in a semifinished product, a steel material composite having at least two layers is proposed, comprising at least one first layer of a material-removable and/or shearable steel and at least one second layer of a formable steel, cohesively bonded to the first layer. The steel material composite of the invention ensures sufficient formability coupled with good material removability and/or shearability.

Material-removable and/or shearable steels are especially understood to mean free cutting steels (EN 10087). It is also possible to use steels for quenching and tempering (EN 10083), case hardening steels (EN 10084) or nitriding steels (EN 10085), each of which have a sulfur content of at least 0.01% by weight.

Formable steels are especially understood to mean steels of the DC (DIN EN 10130), DD (DIN EN 10111) or DX (DIN EN 10346) qualities, or fine-grain construction steels for cold forming (EN 10149). It is also possible to use steels that can especially be thermally formed in such a way that the required final geometry of the component to be manufactured can be modeled without failure.

In a first execution, the at least first layer of the steel material composite consists, by way of example, aside from Fe and unavoidable impurities from the production, in % by weight, of
C: up to 0.60%,
Si: up to 1.00%,
Mn: up to 2.00%,
P: up to 0.150%,
S: up to 0.50%,
Pb: up to 0.50%,
with $\Sigma P+S+Pb \geq 0.020\%$ by weight,
where the first layer may optionally include one or more of the following optional alloy elements:
optionally Cr: up to 3.0%,
optionally Cu: up to 0.50%,
optionally Nb: up to 0.050%,
optionally Mo: up to 1.0%,
optionally N: up to 0.020%,
optionally Ti: up to 0.020%,
optionally V: up to 0.40%,
optionally Ni: up to 5.0%,
optionally B: up to 0.010%,
optionally Sn: up to 0.050%,
optionally H: up to 0.0010%,
optionally As: up to 0.020%,
optionally Co: up to 0.020%,
optionally O: up to 0.0050%,
optionally Ca: up to 0.0150%,
optionally Al: up to 1.0%.

C is a strengthening alloy element and contributes to increase in hardness as its content increases, in that it is either dissolved in the austenite as an interstitial atom or forms carbides with Fe or the alloy elements Cr, Ti, Nb and/or V that are optionally included in the alloy, which may on the one hand be harder than the surrounding matrix or at least may distort it such that the hardness of the matrix increases. C is therefore present with contents of at least 0.020% by weight, especially of at least 0.070% by weight, preferably of at least 0.10% by weight, in order to achieve or establish a desired hardness and ensure a certain resistance for mechanical processing. The C content is limited to a maximum of 0.60% by weight, especially a maximum of 0.55% by weight.

Si is an alloy element that can contribute to solid solution hardening and, according to its content, has a positive effect in an increase in hardness, such that a content of at least 0.020% by weight, especially at least 0.050% by weight, may be present. In the case of smaller contents, efficacy of Si is not clearly detectable. But Si does not have an adverse effect on the properties of the steel either. If too much silicon is added to the steel, this has an adverse effect on forming capacity and toughness properties. Therefore, the alloy element is limited to a maximum of 1.00% by weight, especially a maximum of 0.60% by weight, preferably a maximum of 0.40% by weight, in order especially to ensure sufficient rollability. Moreover, Si can be used for deoxidation of the steel if an optional use of Al, for example, is to be avoided, in order to prevent unwanted binding, for example of N.

Mn is an alloy element that can contribute to hardenability and is especially used for binding of S to give MnS, such that a content of at least 0.20% by weight, especially at least 0.40% by weight, may be present. Manganese lowers the critical cooling rate, by means of which it is possible to increase hardenability, especially in a heat treatment process. The alloy element is limited to a maximum of 2.00% by weight, especially a maximum of 1.50% by weight, in order to ensure good forming characteristics. Moreover, Mn has a significant segregating effect and is therefore preferably limited to a maximum of 1.30% by weight.

P is an iron-accompanying element that has a significant toughness-reducing effect and is generally among the unwanted accompanying elements. Owing to its low diffusion rate on solidification of the melt, P can lead to significant segregation. For these given reasons, the element is limited to a maximum of 0.150% by weight, especially a maximum of 0.110% by weight.

S in the steel has a significant tendency to segregation and forms unwanted FeS, and for that reason it can be bound by including Mn in the alloy. The S content is therefore limited to a maximum of 0.50% by weight, especially a maximum of 0.45% by weight.

Pb can be included in the alloy up to a maximum of 0.50% by weight, especially a maximum of 0.40% by weight, preferably a maximum of 0.350% by weight, which can lead to a smooth surface of the steel on mechanical processing. Alloy contents above the upper limit mentioned would lead to exceedance of the legal limits.

Preferably, at least one of the alloy elements S, P, Pb, owing to the positive influence on material removability through formation of brittle inclusions in the steel, where chips can break in the course of mechanical or material-removing processing, individually or in the sum total of either S and P or S and Pb or P and Pb or S and P and Pb, are present at at least 0.020% by weight, especially at least 0.050% by weight, preferably at least 0.10% by weight, more preferably at least 0.150% by weight. Correspondingly, in sum total, $\Sigma P+S+Pb \geq 0.020\%$ by weight.

Cr as an optional alloy element, according to its content, may contribute to establishment of strength, especially with a content of at least 0.020% by weight. In addition, Cr can be used alone or in combination with other elements as carbide former. Owing to its positive effect on the toughness of the material, the Cr content may preferably be adjusted to at least 0.150% by weight. For economic reasons, the alloy element may be limited to a maximum of 3.0% by weight, especially a maximum of 2.50% by weight, preferably a maximum of 2.0% by weight.

Cu may, as an optional alloy element, contribute to an increase in hardness through precipitation hardening and especially be included in the alloy with a content of at least 0.010% by weight. Cu may be limited to a maximum of 0.50% by weight.

Ti, Nb, and/or V may be included in the alloy as optional alloy elements individually or in combination for grain refining. In addition, Ti may be used for binding of N. In particular, however, these elements may be used as microalloying elements in order to form strengthening carbides, nitrides and/or carbonitrides. To assure their efficacy, Ti, Nb and/or V may be used with contents of respectively or collectively at least 0.010% by weight. For complete binding of N, the content of Ti would have to be at least 3.42*N. Nb is limited to a maximum of 0.050% by weight, especially a maximum of 0.030% by weight, Ti to a maximum of 0.020% by weight, especially a maximum of 0.0150% by weight, and V to a maximum of 0.40% by weight, especially a maximum of 0.250% by weight, since higher contents can have an adverse effect on the material properties, especially an adverse effect on the toughness of the first layer.

Mo may optionally be included in the alloy as carbide former for increasing the yield point and improving toughness. In order to assure the efficacy of these effects, it is possible to include a content of at least 0.010% by weight in the alloy. For reasons of cost, the maximum content is limited to a maximum of 1.0% by weight, preferably a maximum of 0.70% by weight.

N as optional alloy element may display a similar effect to C since its ability to form nitride can have a positive effect on strength. In the optional presence of Al, aluminum nitrides can form, which improve nucleation and hinder grain growth. The content is limited to a maximum of 0.020% by weight. Preference is given to establishing a maximum content of 0.0150% by weight in order to avoid the unwanted formation of coarse titanium nitrides in the case of optional presence of Ti that would have an adverse effect on toughness. Moreover, when the optional alloy element boron is used, this is bound by nitrogen if the aluminum or titanium content is not high enough or absent.

Ni, which can optionally be included in the alloy up to a maximum of 5.0% by weight, can have a positive effect on the affordability of the material. For reasons of cost, especially contents of not more than 4.50% by weight, preferably not more than 4.30% by weight, are established.

B as optional alloy element in atomic form can delay microstructure transformation to ferrite/bainite and improve strength especially when N is bound by optionally strong nitride formers such as Al and/or Nb, and may be present with a content especially of at least 0.0005% by weight. The alloy element is limited to a maximum of 0.010% by weight, especially to a maximum of 0.0070% by weight, since higher contents can have an adverse effect on the material properties, especially with respect to toughness at the grain boundaries.

Sn, As and/or Co are optional alloy elements that, individually or in combination, may be counted among the impurities if they are not included in the alloy deliberately for establishment of specific properties. The contents are limited to a maximum of 0.050% by weight of Sn, especially a maximum of 0.040% by weight of Sn, to a maximum of 0.020% by weight of Co, and to a maximum of 0.020% by weight of As.

is optional and typically undesirable, but may also be beneficial in very small contents in the present invention since oxide coatings, especially at the separating layer between the first and second layers, hinder diffusion between the deliberately differently alloyed steels, as described, for example, in German published specification DE 10 2016 204 567 A1. The maximum content of oxygen is stated as 0.0050% by weight, preferably 0.0020% by weight.

H is optional and, as the smallest atom, is very mobile between intermediate lattice sites in the steel and can especially lead to tears in the core in the course of cooling from hot rolling. The element hydrogen is therefore reduced to a maximum of 0.0010% by weight, especially a maximum of 0.0006% by weight, preferably a maximum of 0.0004% by weight, further preferably a maximum of 0.0002% by weight.

Ca can optionally be included in the melt of the alloy as desulfurizing agent and for controlled influence on the sulfide level in contents of up to 0.0150% by weight, preferably up to 0.0050% by weight, which leads to altered plasticity of the sulfides in the course of hot rolling. Furthermore, the addition of Ca preferably also improves cold forming characteristics. The effects described are effective over and above contents of 0.0005% by weight, and this limit can therefore be chosen as the minimum in the case of optional use of Ca.

Al can especially contribute to deoxidation, and therefore a content of at least 0.010% by weight can optionally be established. The alloy element is limited to a maximum of 1.0% by weight to assure maximum castability, preferably a maximum of 0.30% by weight in order essentially to reduce and/or avoid unwanted precipitates in the material, especially in the form of nonmetallic oxidic inclusions, that can adversely affect the material properties. For example, the content is set between 0.020% and 0.30% by weight. Al can also be used for the purpose of binding the nitrogen optionally present in the steel.

In one execution, the at least second layer of the steel material composite consists of a steel having an elongation at break $A_{80}>10$, especially an elongation at break $A_{80}>15$, preferably an elongation at break $A_{80}>20$, more preferably an elongation at break $A_{80}>25$.

In one execution, the first layer has a material thickness between 5% and 70%, especially between 10% and 50%, preferably between 20% and 40%, based on the total material thickness of the steel material composite. The material thickness of the first layer of at least 5% is intended to ensure that mechanical processing is implementable exclusively in the first layer. The restriction of the material thickness of the first layer to a maximum of 70% is intended to impart a certain formability to the steel material composite. The total material thickness is between 0.5 and 20.0 mm, especially between 1.0 and 15.0 mm, preferably between 2.0 and 10.0 mm. In its simplest execution, the steel material composite has exactly one first layer and one second layer. According to the application, the steel material composite may also have at least three-layer execution, in which case the first layer may be disposed as core layer between two outer layers each formed from the second layer. Alternatively, it is also possible for the second layer to be disposed as core layer between two outer layers each formed from the first layer. The outer layers in the at least three-layer execution may have either a symmetric or asymmetric construction.

In a further execution, the steel material composite has been produced by means of cladding, especially roll cladding, preferably hot roll cladding, as described, for example, in German patent specification DE 10 2005 006 606 B3. Reference is made to this patent specification, the content of which is hereby incorporated into this application. Composite production is general prior art.

In a second aspect, the invention relates to a method for producing a component, wherein a steel material composite of the invention is provided and is formed, especially cold-formed, to a preform and the preform is mechanically processed at least in sections in the region of the first layer to create a final form or further form, especially for further process steps. Mechanical processing is especially understood to mean material-removing processing, for example turning, machining and/or drilling, in sections in the region of the first layer. According to the arrangement of the first layer in the component, for example as an accessible layer, essentially complete material-removing processing of the surface is possible. If the first layer is only partly accessible, for example when it is disposed as the core layer in the component in an at least three-layer execution, the first layer is indeed processible by material removal only in the region of the end face of the component.

In one execution of the method, the final form or further form may be heat-treated. A heat treatment can establish further properties or improved properties in the component, for example by stress-relief annealing or hardening with optionally subsequent tempering or surface hardening in the course of carburizing or nitriding.

In a third aspect, the invention relates to a use of a component produced by one of the aforementioned methods as component in motor vehicle or metal construction, especially in the drivetrain of a motor vehicle. The drivetrain of a motor vehicle comprises all components that transmit the engine power to the wheels. These include, starting from the engine, the assemblies of clutch and transmission, powertrain, driveshafts and differentials. In hybrid vehicles, in the case of full hybrids and plug-ins, and pure electrical vehicles, the electric motors are included. Illustrative components may be disk supports, rotor supports, stator supports, pressure plates, timing belt pulleys, encoder wheels, rotor wheels and shafts.

Preferably, the use relates to all rotationally symmetric components that still have to be processed by material removal at least in sections after being shaped without material removal.

BRIEF DESCRIPTION OF DRAWINGS

There follows a detailed elucidation of the invention with reference to a drawing that shows multiple working examples. Identical parts are always given the same reference numerals. The figures show.

BEST MODE FOR CARRYING OUT THE INVENTION

Commercial flat steel products can be used with particular preference to produce steel material composites of the invention by means of hot roll cladding, especially in order to produce semifinished products that can combine opposing properties, for example sufficient formability coupled with good material removability and/or shearability. For this purpose, sheet metal blanks and/or slabs composed of at least two layers (1, 2, 3, 4) having different properties are stacked one on top of another, and these are cohesively bonded to one another at least in regions along their edges, preferably by means of welding to give a preliminary composite. The preliminary composite is brought to a temperature of at least 1000° C. and, in multiple steps, hot-rolled to give a steel material composite having a total material thickness, for example, of 2.0 to 10.0 mm. If required, the steel material composite can be further reduced to lower total material thicknesses, especially by means of cold rolling.

Figure 1:
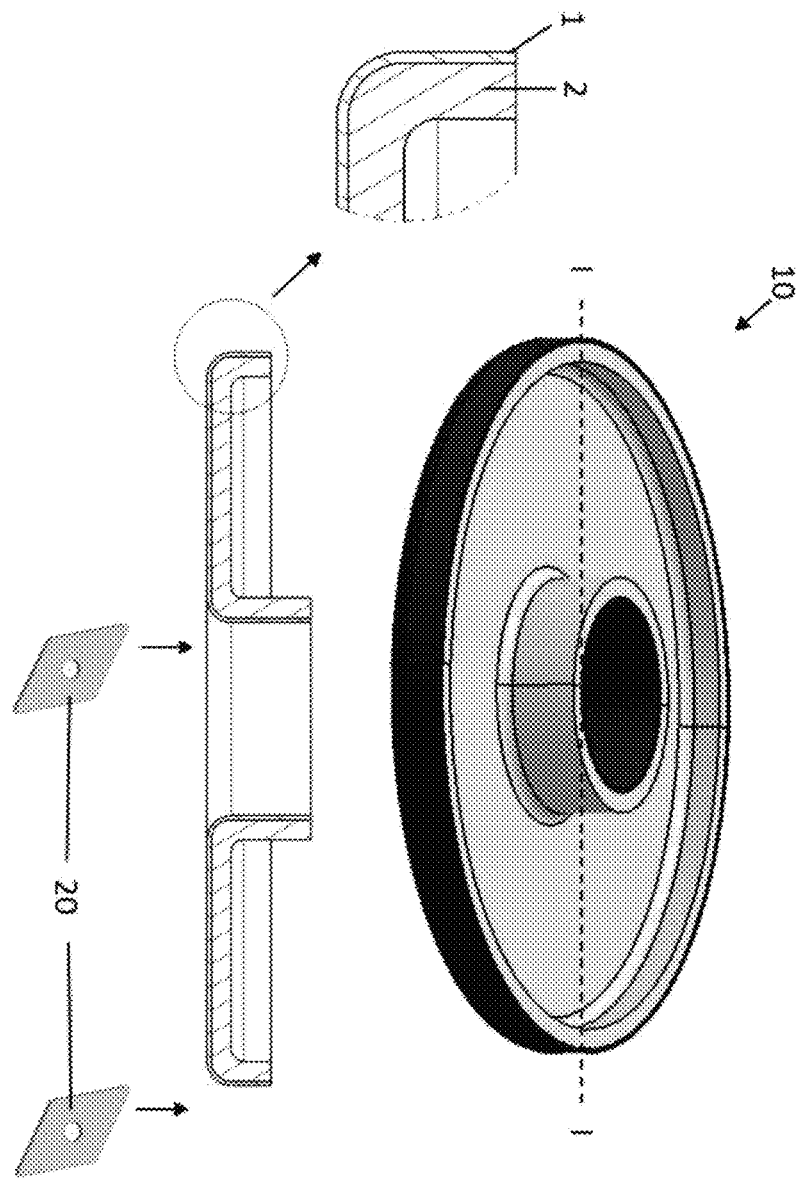
FIG. 1) a first working example of a component of the invention in different designs, FIG. 2) a second working example of a component of the invention in different designs and FIG. 3) a third working example of a component of the invention in different designs.

FIG. 1 shows a first working example of an inventive component (10) in different views: in a perspective view and in a section view according to section I-I, and in an enlarged partial section view. The component (10) is formed by a steel material composite that has been produced in the course of the abovementioned hot roll cladding operation and comprises a first layer (1) and a second layer (2) that have been cohesively bonded to one another. The first layer (1) consists of a steel having good material removability and/or shearability, and the second layer (2) consists of a steel having good formability. The first layer (1) may especially consist of a free cutting steel according to EN 10087, for example a steel with the 11SMn30 designation, or of a steel for quenching and tempering according to EN 10083 with a sulfur content of at least 0.01% by weight, for example of a steel with the 42CrMoS4 designation. The second layer (2) may consist of a steel having an elongation at break $A_{80}$>10, especially an elongation at break $A_{80}$>15, for example of a steel having the DC designation according to DIN EN 10130, having the DD designation according to DIN EN 10111, having the DX designation according to DIN EN 10346 or having the S355MC designation according to DIN EN 10149-2.

For production of component (10), an essentially two-dimensional steel material composite was provided, which had a first layer (1) having a material thickness of at least 25% based on the overall material thickness of the steel material composite. By virtue of the higher percentage of the steel having good formability (second layer, 2), it is possible to assure adequate and complex shaping. The steel material composite was cold-formed to a preform by means of suitable shaping means (not shown), and the surface of the preform was converted to its final form, or to a further form for further process steps, by single-sided material-removing processing by suitable means (20). Alternatively, the steel material composite, for production of a preform, can also be hot-formed if required. The removal of material reduced the material thickness of the first layer (1) to less than half of the original material thickness of the first layer prior to the mechanical processing. The mechanical processing need not be effected completely over the entire surface area of the first layer (1), but can also be performed merely in sections as required. The mechanical processing may also be followed by a heat treatment on the final form or on the further form for improvement of the properties.

Figure 2:
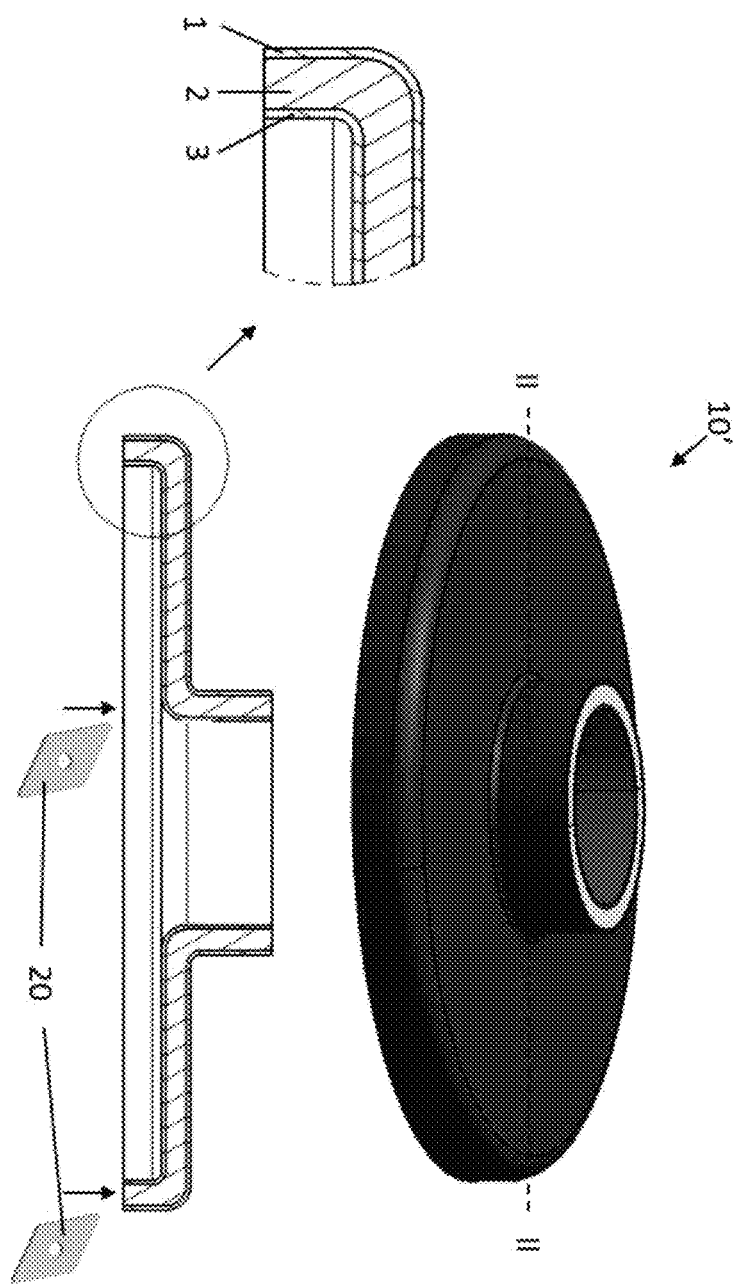

FIG. 2 shows a second working example of an inventive component (10') in different views: in a perspective view and in a section view according to section II-II, and in an enlarged partial section view. Component (10'), by comparison with component (10), is formed by a three-layer steel material composite. The steel material composite comprises a second layer (2) disposed as core layer between two outer layers, each of which has been formed from the first layer (1, 3).

For production of component (10'), an essentially two-dimensional steel material composite was provided, which had two first layers (1, 3) each having a material thickness of at least 20%, based on the overall material thickness of the steel material composite. The steel material composite was cold-formed to a preform by means of suitable shaping means (not shown), and the preform, or more specifically the two surfaces of the first layer (1, 3), was processed by material removal on both sides for production of a final form or a further form by suitable means (20). Alternatively, the steel material composite, for production of a preform, can also be hot-formed if required. In order to meet the accuracy and/or surface demands on the overall component (10'), material removal was effected on both sides, with a reduction in material thickness by about ¼ of the original material thicknesses of the first layers (1, 3) on either side prior to the mechanical processing. The mechanical processing need not be effected completely over the entire surface of the first layers (1, 3), but can also be performed merely in sections as required. The mechanical processing may also be followed by a heat treatment on the final form or on the further form for improvement of the properties.

Figure 3:
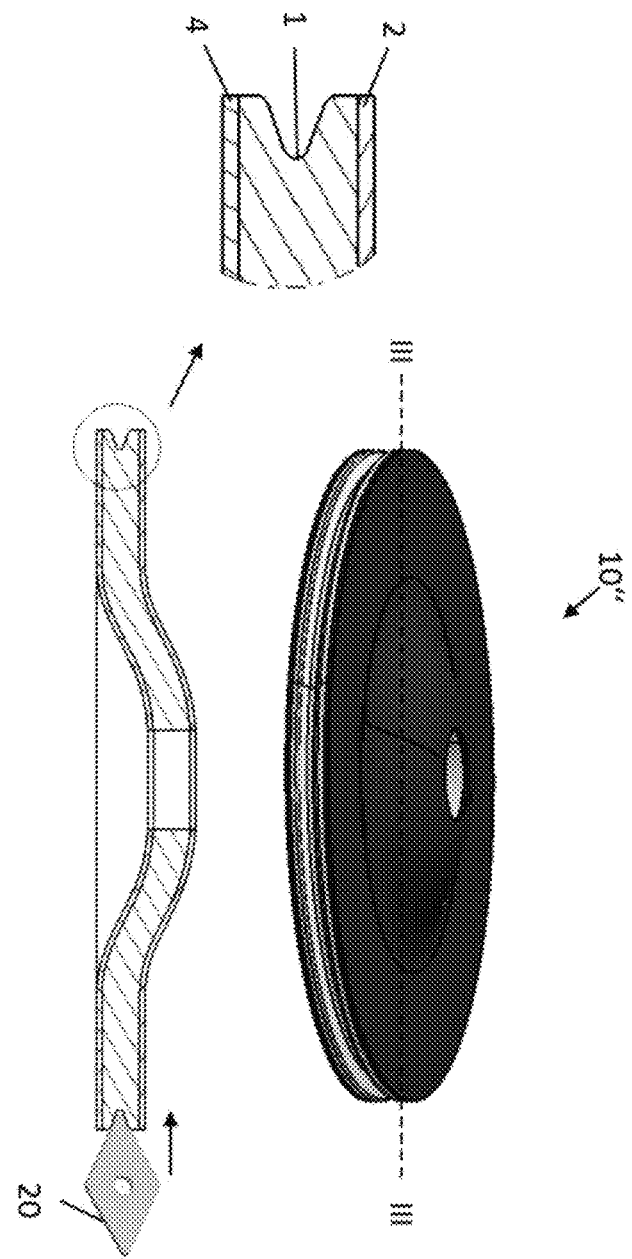

FIG. 3 shows a third working example of an inventive component (10") in different views: in a perspective view and in a section view according to section III-III, and in an enlarged partial section view. Component (10"), like component (10'), is likewise formed by a three-layer steel material composite, but with the difference that the first layer (1) is arranged as core layer between two outer layers each formed from the second layer (2, 4).

For production of component (10"), an essentially two-dimensional steel material composite was provided, which had a first layer (1) having a material thickness of at least 50% based on the overall material thickness of the steel material composite. The steel material composite was cold-formed to a preform by means of suitable shaping means (not shown), and the preform, for creation of a final form, was subjected to mechanical or material-removing processing by suitable means (20) from the end face, with introduction of a circumferential geometry in the form of a groove into the component (10") in the end face by material removal. Alternatively, the steel material composite, for production of a preform, can also be hot-formed if required. The mechanical processing may also be followed by a heat treatment on the final form to improve the properties.

The invention is not limited to the executions described; instead, the individual features are combinable with one another as desired. More preferably, the component of the invention or the component that can be produced from the steel material composite of the invention can be used as a component in motor vehicle or metal construction, especially as a component in the drivetrain of a motor vehicle, preferably in the form of a rotationally symmetric component.

The invention claimed is:

1. A steel material composite having at least two layers, comprising:
    at least one first layer of at least one of a material-removable and shearable steel; and
    at least one second layer of a formable steel, cohesively bonded to the at least one first layer; and
    wherein the at least one first layer, aside from Fe and unavoidable impurities from the production, consists of, in % by weight,
    C: up to 0.60%,
    Si: up to 1.00%,
    Mn: up to 2.00%,
    P: up to 0.150%,
    S: up to 0.50%,
    Pb: up to 0.50%,
    with Σ P+S+Pb≥0.050% by weight.

2. The steel material composite as claimed in claim 1 wherein the at least one second layer consists of a steel having an elongation at break $A_{80}$>10.

3. The steel material composite as claimed in claim 2 wherein the first layer has a material thickness between 5% and 70%, based on a total material thickness of the steel material composite.

4. The steel material composite as claimed in claim 3 wherein the steel material composite has been produced by means of hot roll cladding.

5. A steel material composite having at least two layers, comprising:
- at least one first layer of at least one of a material-removable and shearable steel; and
- at least one second layer of a formable steel, cohesively bonded to the at least one first layer; and
- wherein the at least one first layer, aside from Fe and unavoidable impurities from the production, comprises of, in % by weight,
- C: up to 0.60%;
- Si: up to 1.00%;
- Mn: up to 2.00%;
- P: up to 0.150%;
- S: up to 0.50%;
- Pb: up to 0.50%;
- with Σ P+S+Pb≥0.050% by weight;
- where the first layer includes at least one of:
  - Cr: up to 3.0%;
  - Cu: up to 0.50%;
  - Nb: up to 0.050%;
  - Mo: up to 1.0%;
    - N: up to 0.020%;
    - Ti: up to 0.020%;
    - V: up to 0.40%;
    - Ni: up to 5.0%;
    - B: up to 0.010%;
    - Sn: up to 0.050%;
    - H: up to 0.0010%;
    - As: up to 0.020%;
    - Co: up to 0.020%;
    - O: up to 0.0050%;
    - Ca: up to 0.0150%; and
    - Al: up to 1.0%; and
- wherein the at least one second layer consists of a steel having an elongation at break $A_{80}>15$.

* * * * *